No. 895,069. PATENTED AUG. 4, 1908.
T. V. BUCKWALTER.
FOLDING PLATFORM FOR OPERATORS OF MOTOR TRUCKS.
APPLICATION FILED DEC. 10, 1907.

2 SHEETS—SHEET 1.

WITNESSES:

INVENTOR
Tracy V. Buckwalter
BY
Chas. N. Butler
ATTORNEY.

No. 895,069. PATENTED AUG. 4, 1908.
T. V. BUCKWALTER.
FOLDING PLATFORM FOR OPERATORS OF MOTOR TRUCKS.
APPLICATION FILED DEC. 10, 1907.

2 SHEETS—SHEET 2.

WITNESSES:

INVENTOR
Tracy V. Buckwalter
BY
Chas. R. Butler
ATTORNEY.

UNITED STATES PATENT OFFICE.

TRACY V. BUCKWALTER, OF ALTOONA, PENNSYLVANIA.

FOLDING PLATFORM FOR OPERATORS OF MOTOR-TRUCKS.

No. 895,069.  Specification of Letters Patent.  Patented Aug. 4, 1908.

Application filed December 10, 1907. Serial No. 405,895.

*To all whom it may concern:*

Be it known that I, TRACY V. BUCK-WALTER, a citizen of the United States, residing at Altoona, in the county of Blair and State of Pennsylvania, have invented a Folding Platform for Operators of Motor-Trucks, of which the following is a specification.

This invention is a folding platform for operators of motor trucks such as are used in handling baggage, particularly in railway stations. For such use it is desirable to have means for steering at each end, and, therefore, to support the operator by mechanism that will automatically fold out of the way when not in use while being readily drawn to and held in operative position.

The leading purpose of my invention is to provide a simple, strong and readily operated apparatus having the foregoing characteristics. To this end I have devised a platform which is connected with the truck so as to revolve about a vertical axis. A coiled spring acts to lift it out of a locking engagement in the operative position and turn it into a locking engagement in the inoperative position. In returning it from the inoperative to the operative position, a downward and outward pressure unlocks and revolves it to the operative position, where it is locked by the weight of the operator.

Figure 1:
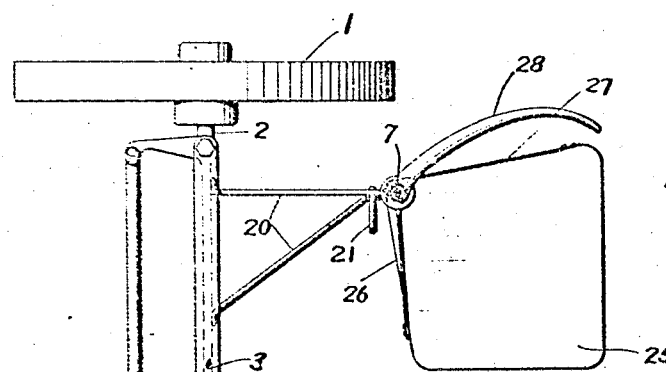
Figure 2:
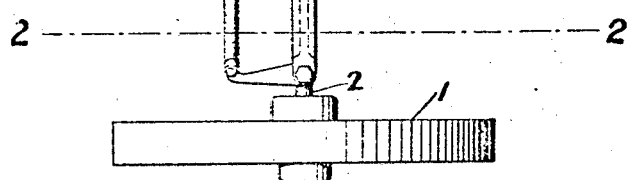
Figure 2A:
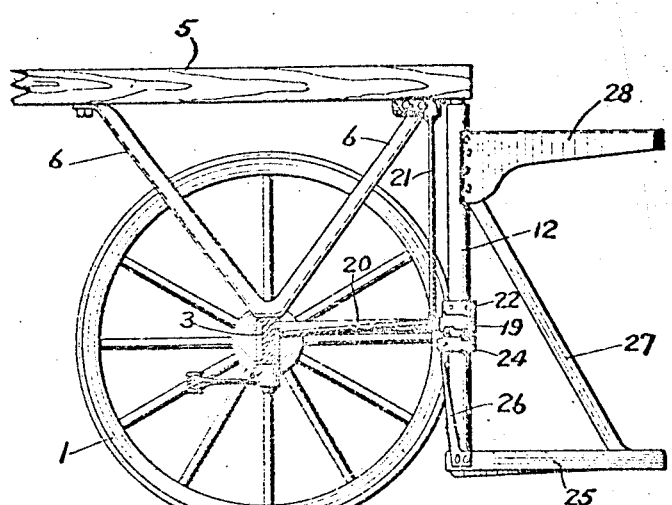
Figure 3:
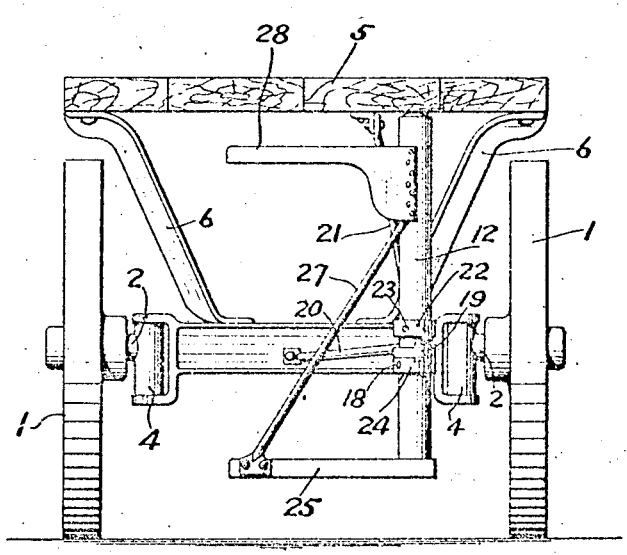
Figure 4:
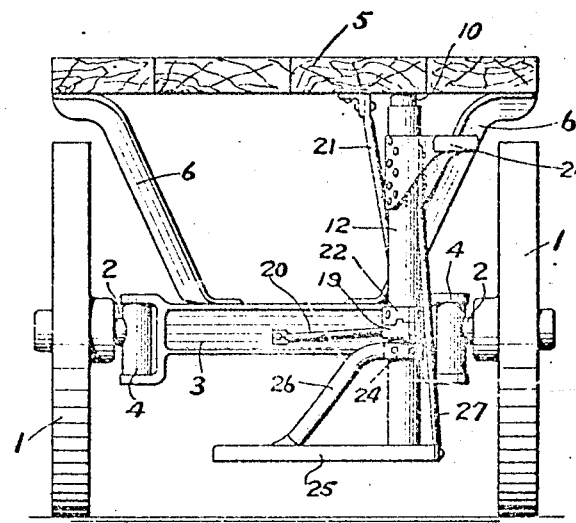
Figure 5:
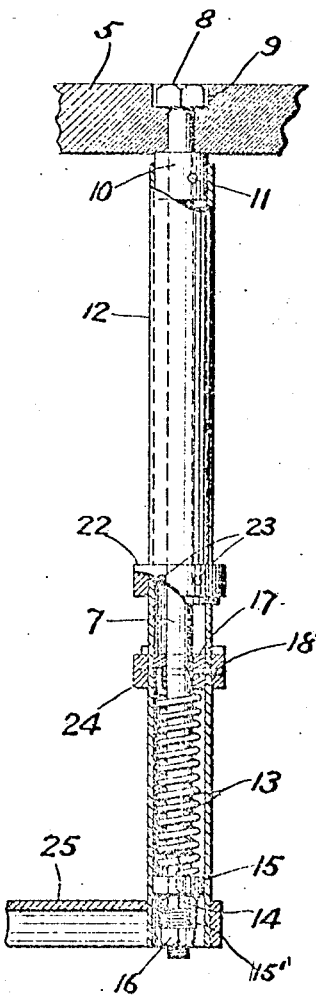

In the accompanying drawings, Figure 1 is a sectional plan view of a truck having my improvements connected therewith in the operative position; Fig. 2 is a sectional elevation taken on the line 2—2 of Fig. 1; Fig. 2ª is a developed view of the locking mechanism; Fig. 3 is an end elevation of the truck with the platform in the inoperative position; Fig. 4 is an end elevation of the truck with the platform in the operative position, and Fig. 5 is a sectional elevation showing the relation of the truck platform, the operator's platform and the connecting mechanism.

The invention, as illustrated in the drawings, is applied to a truck comprising wheels 1, spindles 2 therefor, beams 3, knuckle joints 4 connecting the spindles to the beams, baggage platform 5, and struts 6 supporting the baggage platform on the beams.

The improvements, in the form illustrated, comprise the shaft 7 which extends through the baggage platform downwardly to approximately the level at which the operator's platform is to be supported, the shaft having thereon an angular head 8, which engages a corresponding socket 9 in the truck platform, and a cylindrical collar 10 fixed thereto, by a key 11, in engagement with the bottom of such platform. A cylindrical tube or hollow column 12 is sleeved on the shaft, which affords an axial supporting member therefor, and is carried by a coiled spring 13, having its lower end fixed to the shaft and its upper end fixed to the tube. To provide an adjustable anchorage for the spring at the lower end of the shaft, the latter is provided with the squared or angular section 14 which holds a collar 15 having a section 15' engaging the section 14 so that it can move longitudinally thereon and cannot revolve, the lower end of the spring being fixed to the collar. A nut 16 on the shaft serves to hold the collar thereon, the collar dropping so that it can be revolved to regulate the torsion of the spring upon slacking the nut and being held against revolution by engagement with the angular section of the shaft on drawing up the nut. This collar has an exterior cylindrical surface to provide a journal bearing for the lower end of the tube, which latter has a journal bearing at its upper end on the collar 10. An anchorage is provided for the upper end of the spring by a collar 17, the latter being fixed within the tube by keys 18 and having a revoluble bearing on the shaft.

A clutch ring or collar 19, having the oppositely disposed projections 19ª and 19ᵇ, is fixed to the truck by the struts 20 (which connect it to the beam) and the tie rod 21 (which connects it to the truck platform). A clutch ring or collar 22, having the recesses 22ª and the projections 22ᵇ, is fixed to the tube, above the collar 19, by the keys 23. A clutch ring or collar 24, having the recesses 24ᵇ and projections 24ᶜ, is fixed to the tube, beneath the collar 19, by the keys 18. The operator's platform 25 is fixed to the foot of the tube and is connected by the tie rod 26 to the collar 24 and by the tie 27 to the upper 100 part of the tube; and an arm or body rest 28 is fixed to the upper end of the tube.

It will be understood, by the foregoing description, that the spring 13 is so adjusted by its connections with the anchors 15 and 17 that, when the platform is locked in the operative position, such spring will act to elevate the tube 12, disengage the engaged clutch members 19 and 22 by withdrawing the recesses 22ª from the projections 19ª, revolve the tube and platform to the inner position, and engage the clutch members 19 and 24 by causing the recesses 24$^b$ to engage the projections 19$^b$; the projections 22$^b$ and 24$^c$ engaging the projections 19$^a$ and 19$^b$ to limit the inward movement. To bring the platform to the outer position, the tube is depressed and turned, as by pressing downwardly and outwardly on the arm 28, by which the recesses 24$^b$ are withdrawn from registration with the projections 19$^b$ and the recesses 22$^a$ engaged with the projections 19$^a$. The projections 19$^a$ and 19$^b$ engage the projections 22$^b$ and 24$^c$ to limit the outward movement and the locking engagement in the operative position is maintained by the operator's weight on the platform.

Having described my invention, I claim:—

1. A truck having a supporting member, an operator's platform connected in revoluble relation to said supporting member and automatically operating mechanism for revolving said platform from the operative to the inoperative position.

2. A truck having a vertical supporting member, an operator's platform connected to move horizontally in revoluble relation to said supporting member, and means for revolving said platform from the operative to the inoperative position.

3. A truck having a vertical supporting member, an operator's platform connected in revoluble relation to said member, and means for locking said platform in a definite position.

4. A truck having a vertical supporting member, an operator's platform connected in revoluble relation to said member, and a coiled spring having one end fixed in relation to said member and the other end fixed in relation to said platform whereby said platform is carried and revolved in relation to said member.

5. A truck having an axial supporting member, an operator's platform connected in revoluble and longitudinally movable relation to said axial supporting member, and a spring through which said axial supporting member carries said platform.

6. A truck, a vertical supporting member connected thereto, a platform connected in revoluble and longitudinally movable relation to said supporting member, and a coiled spring having one end fixed in relation to said member and the other end fixed in relation to said platform.

7. A truck, a shaft fixed thereto, a platform connected in revoluble and longitudinally movable relation to said shaft, and clutch mechanism for locking said platform in relation to said shaft.

8. A truck having a baggage platform, a vertical supporting member connected thereto, an operator's platform connected in revoluble and longitudinally movable relation to said member, a coiled spring having one end fixed in relation to said member and the other end fixed in relation to said platform.

9. A platform, a column fixed transversely to said platform, a supporting member with relation to which said column is movable revolubly and longitudinally, and a coiled spring having one end fixed with relation to said column and the other end fixed with relation to said member.

10. A platform, a hollow column fixed to said platform, a shaft on which said column is mounted so as to be movable revolubly and longitudinally thereon, a coiled spring having one end fixed in relation to said column and the other end fixed in relation to said shaft, a fixed clutch member within which said column is movable, and one or more clutch rings fixed on said column and adapted for engagement with the first named clutch member.

11. A truck having a clutching member fixed thereto, and a revoluble platform having a clutching member fixed thereto and coacting with the clutching member fixed to said truck to hold said platform in a definite position, said clutching members having means for limiting the revolution of said platform.

12. A truck having fixed thereto a clutch ring with oppositely disposed projections thereon, a column revoluble within said ring, clutch rings fixed on said column on either side of the clutch ring first named, said clutch rings fixed to said column having projections for engaging the projections on said clutch ring first named to limit the movement of said platform, and recesses to engage the projections on said clutch ring first named to lock said platform.

In witness whereof I have hereunto set my name this 7th day of Dec., 1907, in the presence of the subscribing witnesses.

TRACY V. BUCKWALTER.

Witnesses:
J. L. MINICK,
P. H. MARKLEY.